(12) United States Patent
Lai et al.

(10) Patent No.: US 7,567,829 B2
(45) Date of Patent: Jul. 28, 2009

(54) TELECOMMUNICATION APPARATUS PROVIDED WITH A STOP MEMBER

(75) Inventors: Cheng-Shing Lai, Taipei (TW); Jiang-Rong Chen, Nan King (CN)

(73) Assignee: Inventec Appliances Corp., Taipei (TW)

( * ) Notice: Subject to any disclaimer, the term of this patent is extended or adjusted under 35 U.S.C. 154(b) by 594 days.

(21) Appl. No.: 11/151,446

(22) Filed: Jun. 14, 2005

(65) Prior Publication Data

US 2007/0010299 A1 Jan. 11, 2007

(51) Int. Cl.
*H04M 1/00* (2006.01)
*H04B 1/38* (2006.01)
*G09G 5/00* (2006.01)
*G06F 3/02* (2006.01)
*G06F 1/16* (2006.01)

(52) U.S. Cl. .............. 455/575.3; 455/575.1; 455/575.8; 455/566; 345/156; 345/168; 361/680; 361/683; 361/686

(58) Field of Classification Search .................. 455/572, 455/550.1, 556.1, 575.1–575.3, 90.3, 575.8, 455/575.4; 361/680, 681, 752; 379/433.02, 379/428.01, 447; 345/156, 168
See application file for complete search history.

(56) References Cited

U.S. PATENT DOCUMENTS

| | | | |
|---|---|---|---|
| 5,649,309 A * | 7/1997 | Wilcox et al. ............. 455/575.3 |
| 6,141,569 A * | 10/2000 | Weisshappel et al. ..... 455/575.3 |
| 6,690,353 B2 * | 2/2004 | Chang ......................... 345/156 |
| 7,034,755 B2 * | 4/2006 | Takagi ......................... 343/702 |
| 7,136,687 B2 * | 11/2006 | Chang ..................... 455/575.3 |
| 7,155,266 B2 * | 12/2006 | Stefansen ................ 455/575.3 |
| 7,168,135 B2 * | 1/2007 | Jung et al. ..................... 16/367 |
| 7,274,561 B2 * | 9/2007 | Takeguchi ................... 361/681 |
| 2002/0128053 A1 * | 9/2002 | Jung ........................... 455/575 |
| 2004/0127269 A1 * | 7/2004 | Nonaka ................... 455/575.3 |
| 2004/0137970 A1 * | 7/2004 | Han ......................... 455/575.3 |

* cited by examiner

*Primary Examiner*—Nay A Maung
*Assistant Examiner*—Paul P Tran
(74) *Attorney, Agent, or Firm*—Muncy, Geissler, Olds & Lowe, PLLC

(57) ABSTRACT

A flip phone includes a cover member having a tubular sleeve, a main body having left and right pivot seats sandwiching the tubular sleeve of the cover member therebetween, and a coupler axle disposed within the tubular sleeve to be co-movable together with the cover member relative to the main body. The coupler axle has two opposite pins extending rotatably into the pivot seats of the main body to permit movement of the cover member with respect to the main body. A rubber stop member is fitted into a mounting recess in the main body, and projects outwardly therefrom to separate the tubular sleeve from the upper surface of the main body.

2 Claims, 4 Drawing Sheets

TELECOMMUNICATION APPARATUS PROVIDED WITH A STOP MEMBER

FIELD OF THE INVENTION

The present invention relates to a telecommunication apparatus, more particularly to a flexible rubber stop member for use in the telecommunication apparatus.

BACKGROUND OF THE INVENTION

Telecommunication apparatuses (such as mobile phones) of lately are designed in compact size in order to facilitate carrying thereof. The more convenient for the user to carry the handheld mobile phone, the smaller the dimension should become. In order to eliminate the bulky size (such as stand alone type), some mobile phones are designed in foldable type (generally known as flip phone or flip cell phone).

Referring to FIG. 1, a conventional flip phone 2 generally includes a main body 6, a cover member 4, and a coupler shaft 12. The main body 6 has an input keypad 10 and a pair of spaced apart pivot seats 602 at one end thereof. The cover member 4 has a display screen 8 and a tubular sleeve 402 at one end thereof. The coupler shaft 12 is disposed in the tubular sleeve 402 of the cover member 4, and has two opposite pivots extending rotatably into the pivot seats of the main body 6, thereby permitting rotation of the cover member 4 with respect to the main body 6. The coupler shaft 12 has a flat mating portion abutting against the flat mating portion of the tubular sleeve 402 in such a manner that when the cover member 4 rotates with respect to the main body 6, the tubular sleeve 402 simultaneously rotates with the cover member 4.

It is noted that in order to enhance the external appearance of the conventional flip phone and in order to attract the purchasing inspiration of the customers, the external surfaces of the cover member 4 and the main body 6 are generally coated with decorating paints (or electroplated). Frequent use of the conventional flip phone 2 results in folding and unfolding actions of the tubular sleeve 402 together with the cover member 4 relative to the main portion 6 (due to relative movement between the main body 6 and the cover member 4). Since each folding and unfolding actions of the tubular sleeve 402 results in rubbing against the upper surface of the main body 6, the decorated paint on the main body 6 and the tubular sleeve 402 will eventually peel off, thereby disposing the conventional flip phone in an ugly state or unattractive position.

To solve the aforesaid drawback, in one conventional flip phone, a rubber pad 20 is adhered on the upper surface of the main body 6 in order to prevent peeling off the decorated pain from the tubular sleeve 402 and the main body 6. However, the rubber pad 20 may displace on the main body 6 and deform after a long-term use. The paint peeling will occur once the rubber pad 20 falls off the main body 6.

In still another conventional flip phone, a stop member 22 is disposed between the pivot seats 602 of the main body 6 so as to define the unfolded angle of the cover member 4 relative to the main body 6 when the conventional flip phone is disposed in the used condition. Since the stop member 22 is made from hard material and is integrally formed with the main body 6, frequent resting of the tubular sleeve 402 on the stop member 22 when the conventional flip phone is in use in the long term can result in peeling off the decorated paint from the main body 6.

SUMMARY OF THE INVENTION

The main object of the present invention is to provide a rubber stop member for use in the flip phone. The rubber stop member has a unique construction and is secured in the main body of the flip phone in such a manner to prevent deform and falling off therefrom regardless of long-term use of the flip phone.

A foldable telecommunication apparatus (such as flip phone) is provided according to the present invention to include: a first portion having a sleeve on a side thereof; a second portion formed with first and second pivot seats receiving the sleeve of the first portion therebetween, and a recess between the pivot seats; a coupler axle engaged with the sleeve of the first portion, and having two pins inserted rotatably in the pivot seats of the first portion; and a rubber stop member disposed in the recess of the second portion, and projecting outwardly therefrom to separate the sleeve of the first portion from the upper surface of the second portion.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENT

Figure 1:
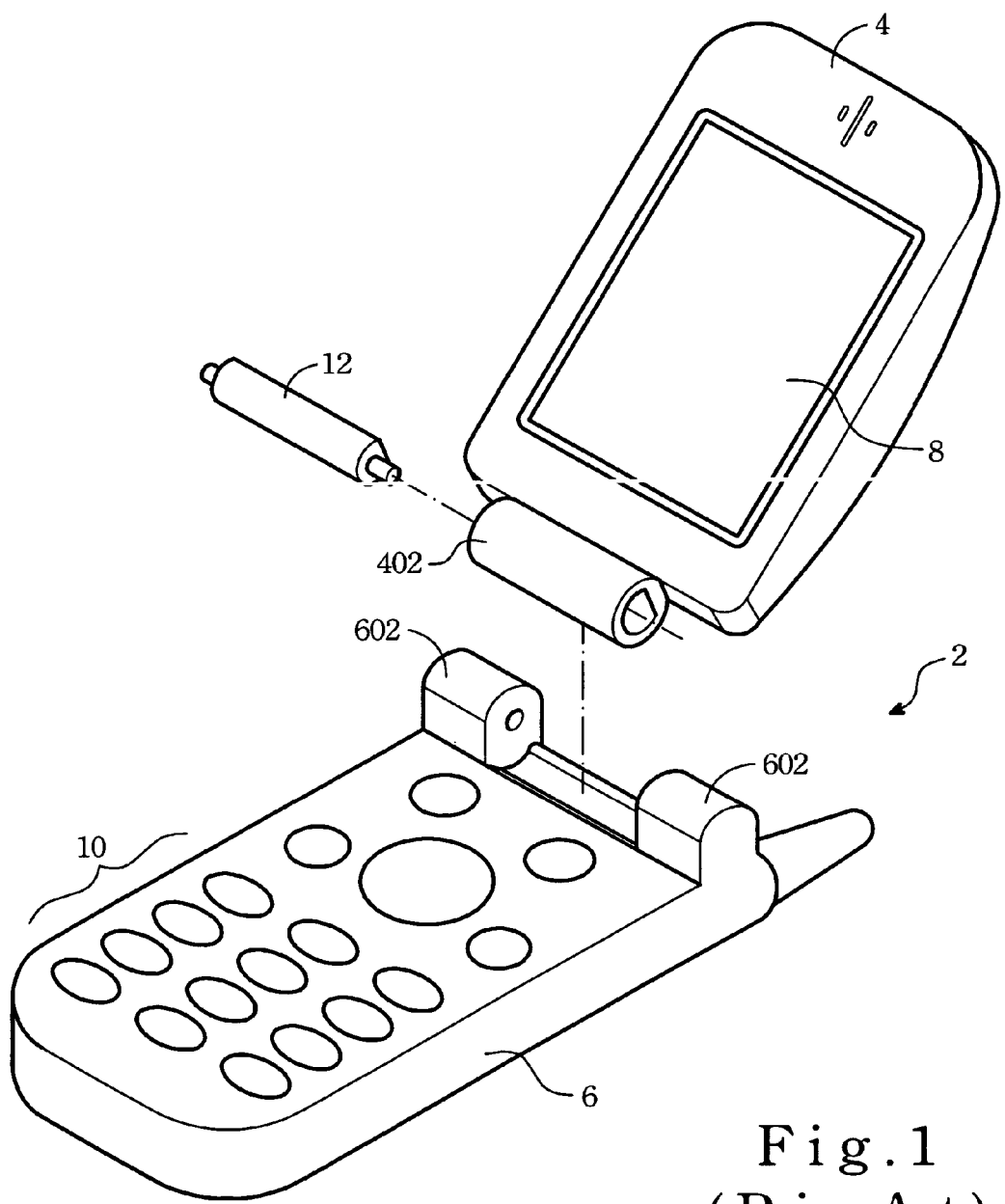
FIG. 1 is an exploded view of a conventional mobile phone.
Figure 2:
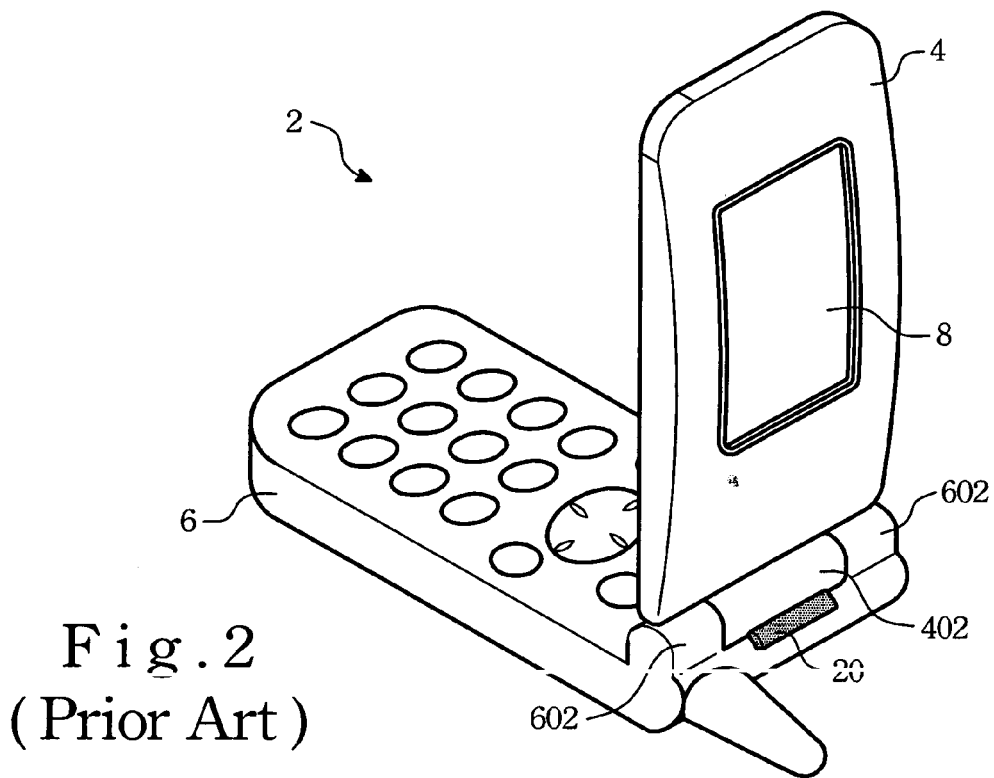
FIG. 2 is a perspective view of another conventional mobile phone.
Figure 3:
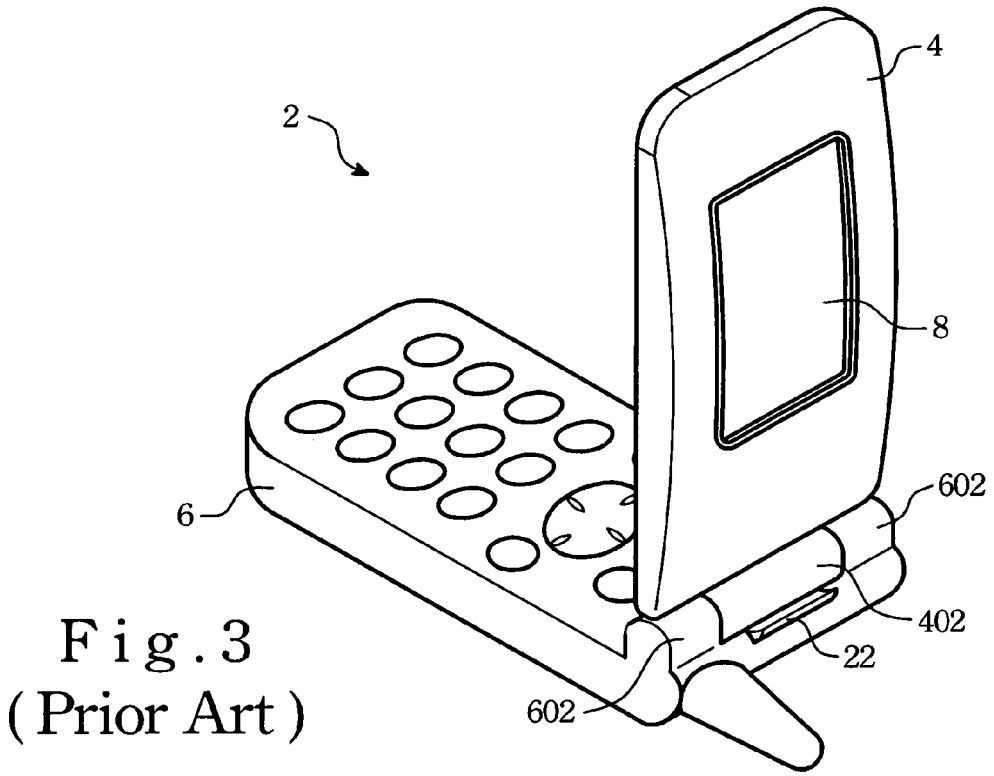
FIG. 3 is a perspective view of still another conventional mobile phone.
Figures 4A, 4B:
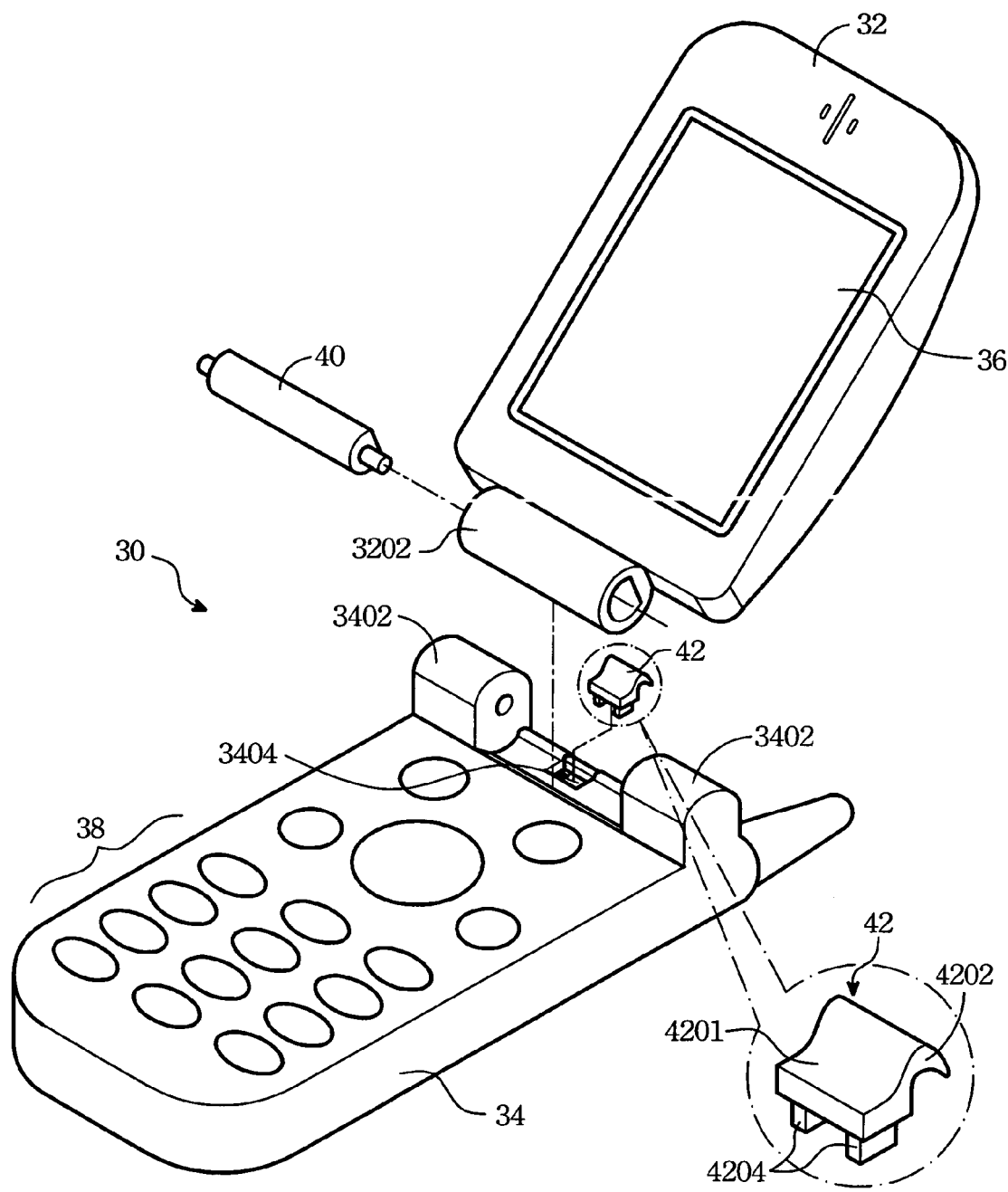
FIG. 4A is an exploded view of the preferred embodiment of a telecommunication apparatus of the present invention.
FIG. 4B is an enlarged view a flexible rubber stop member employed in the preferred embodiment shown in FIG. 4A.

Referring to FIG. 4A, the preferred embodiment of a telecommunication apparatus 30 (such as a mobile phone or a flip phone) according to the present invention is shown to include a first portion 32 (hereinafter called cover member), a second portion 34 (hereinafter called main body), a coupler axle 40, and a resilient rubber stop member 42.

The cover member 32 has a display screen 36 (such as an LCD) for displaying input data or incoming signals, and an end portion formed with a tubular sleeve 3202.

Figure 6:
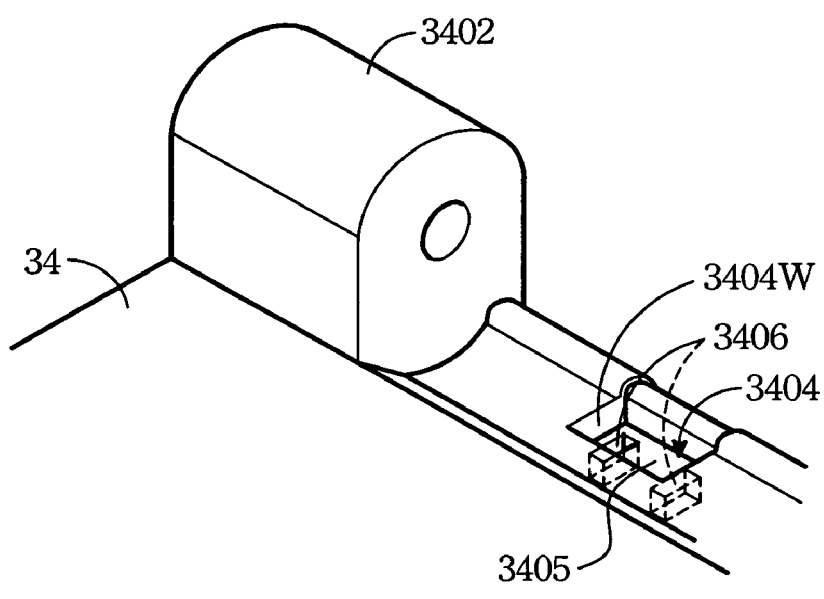
FIG. 6 is a fragmentary view, illustrating a mounting recess formed in the main body of the preferred embodiment of the telecommunication apparatus of the present invention.

The main body 34 is disposed below the cover member 32, and has a keypad 38 for inputting data and an antenna assembly for transmitting and receiving radio signals. The main body 34 has an upper surface formed with spaced apart left and right pivot seats 3402 and a mounting recess 3404 between the pivot seats 32. When the cover member 32 is disposed headlong with the main body 34, the left and right pivot seats 3402 of the main body 34 sandwich the tubular sleeve 3202 of the cover member 32 therebetween. The main body 34 further has a distal ridge 3401 interconnecting the pivot seats 3402. In this embodiment, the distal ridge 3401 of the main body 34 has a convex upper face, the purpose of which will be described later in the following paragraph. The mounting recess 3404 is preferably defined by a recess-confining wall 3404W having a bottom wall portion 3405 formed with two retention holes 3406 (see FIG. 6).

The coupler axle 40 is disposed within the tubular sleeve 3202, and has a flat mating portion abutting against the flat mating portion of the tubular sleeve 3202 in such a manner the latter is co-movable with the cover member 32 relative to the main body 34. The coupler axle 40 has two opposite pins extending rotatably into the pivot seats 3402 of the cover member 32 to permit movement of the cover member 36 with respect to the main body 34 between a closed position, in which, the cover member 36 abuts against the main body 34 (not shown), and an open position, in which, the cover member 32 is spaced apart from the main body 34 (see FIG. 4A).

Figure 5:
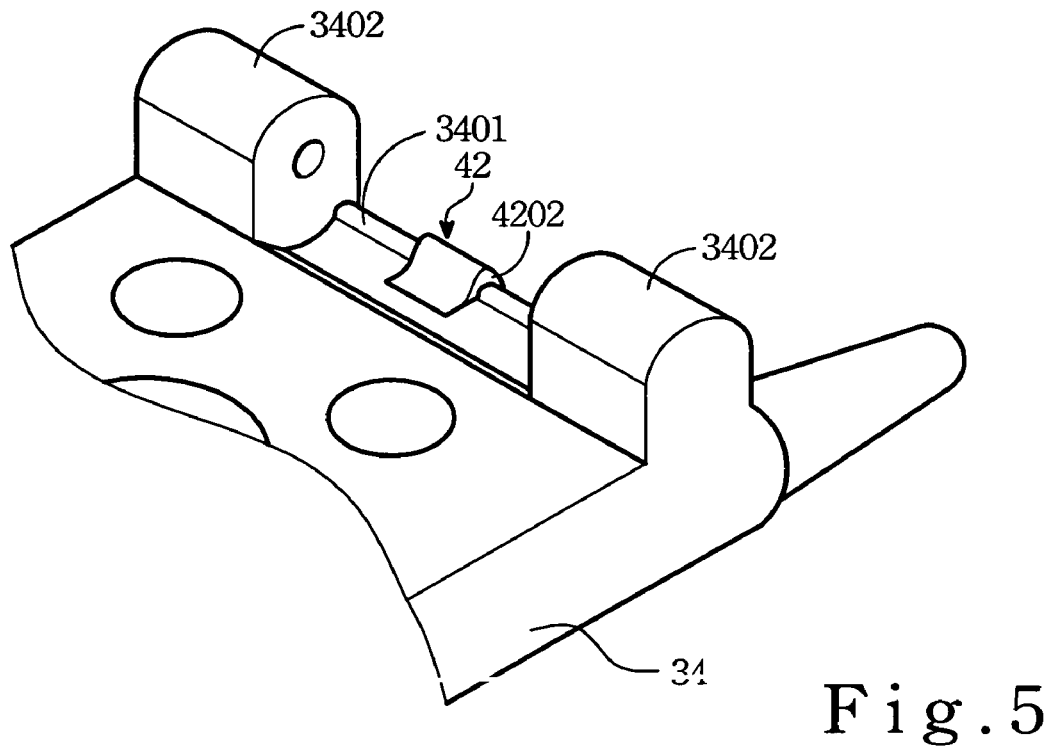
FIG. 5 is a fragmentary view, illustrating how a resilient rubber stop member is mounted on a main body of the preferred embodiment of the telecommunication apparatus of the present invention.

Referring to FIG. 4B, the rubber stop member 42 is made from rubber material, and has a planar portion 4201 and an elevated portion 4202 projecting upwardly from the planar portion 4201. The planar portion 4201 has two lower legs 4204 press-fitted into the retention holes 3406 in the mounting recess 3404 to expose the same from the mounting recess 3404 in the main body 34. Under this condition, the rubber stop member 32 is prevented removal from the main body 34. The elevated portion 4202 of the stop member 42 has a concave lower face overlapping the convex upper face of the distal ridge 3401 of the main body 34 (see FIG. 5).

In use, the stop member 42 will not disengage from the main body 34 regardless of its period of use. Since folding and unfolding actions of the cover member 32 relative to the main body 34 will not cause direct rubbing between the tubular sleeve 3202 and the upper surface of the main body 34, peeling off the decorated paint from the tubular sleeve 3202 and the main body 34 does not occur by virtue of presence of the stop member 42 therebetween, thereby prolonging the service life of the mobile phone of the present invention.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A foldable telecommunication apparatus comprising:
    a first portion having a sleeve on a side thereof;
    a second portion formed with first and second pivot seats receiving said sleeve of said first portion therebetween, and a recess between said pivot seats;
    a coupler axle engaged with said sleeve of said first portion, and having two pins inserted rotatably in said pivot seats of said second portion;
    a rubber stop member disposed in said recess of said second portion, and projecting outwardly therefrom to separate said sleeve of said first portion from said upper surface of said second portion, and said rubber stop member having a planar portion exposing from said recess in said second portion,
    wherein said recess is defined by a recess-confining wall having a bottom wall portion formed with two retention holes, said planar portion of said stop member having two lower legs press-fitted into said retention holes in said recess to prevent removal of said stop member from said second portion.

2. The foldable telecommunication apparatus according to claim 1, wherein said second portion has a distal ridge interconnecting said pivot seats, said recess being located proximate to said distal ridge of said second portion, and an elevated portion projecting upwardly from said planar portion to cover said distal ridge of said second portion.

* * * * *